United States Patent [19]

Rourke et al.

[11] 4,315,837

[45] Feb. 16, 1982

[54] COMPOSITE MATERIAL FOR OZONE REMOVAL

[75] Inventors: John L. Rourke, Fairport; Ronald E. Keukelaar, Rochester, both of N.Y.

[73] Assignee: Xerox Corporation, Stamford, Conn.

[21] Appl. No.: 140,915

[22] Filed: Apr. 16, 1980

[51] Int. Cl.³ .............................................. B01J 31/06
[52] U.S. Cl. ...................................... 252/430; 422/122
[58] Field of Search ................ 252/430, 471; 423/219; 422/122; 427/222

[56] References Cited

U.S. PATENT DOCUMENTS

| | | | |
|---|---|---|---|
| 1,345,323 | 6/1920 | Frazer et al. | 252/471 |
| 1,422,211 | 7/1922 | Lamb | 252/471 X |
| 3,152,088 | 10/1964 | Sandri et al. | 252/429 B |
| 3,196,032 | 7/1965 | Seymour | 427/222 X |
| 3,746,655 | 7/1973 | Urbanic | 252/430 |
| 3,779,785 | 12/1973 | Stiles et al. | 427/222 |
| 3,911,193 | 10/1975 | Resz et al. | 427/222 X |
| 3,974,095 | 8/1976 | Volpin et al. | 252/430 X |
| 3,985,679 | 10/1976 | Taylor et al. | 252/430 |
| 4,200,609 | 4/1980 | Byrd | 422/122 |
| 4,207,291 | 6/1980 | Byrd et al. | 423/219 X |

FOREIGN PATENT DOCUMENTS

| | | | |
|---|---|---|---|
| 1329522 | 5/1963 | France | 252/471 |
| 928120 | 6/1963 | United Kingdom | 427/222 |

*Primary Examiner*—Patrick Garvin

[57] ABSTRACT

A composite material is provided for the removal of ozone from a gaseous stream, which is made of a support matrix having coated on its surface an adhering layer of fine particles of Hopcalite. The support matrix is preferably made of a material that has a relatively board transition region. A particularly preferred material for the matrix is a polymeric ethyl vinylacetate.

15 Claims, 2 Drawing Figures

COMPOSITE MATERIAL FOR OZONE REMOVAL

BACKGROUND OF THE INVENTION AND PRIOR ART STATEMENT

This invention relates to a novel composite material for the removal of noxious substances from a gaseous stream, and to the method for making the material. More particularly, this invention relates to a novel composite material which is effective in the removal of ozone from a gaseous stream.

In the electrophotographic reproducing arts, the usual practice is to deposit a uniform electrostatic charge on an imaging surface, with subsequent selective dissipation of the charge by exposure to a light image of an original document, to form an electrostatic latent image. The electrostatic latent image may then be developed and the developed image transferred to a support to form a copy of the original document. The deposition of the electrostatic charge is usually carried out by a corona device. In addition to precharging the imaging surface of an electrophotographic reproducing machine prior to exposure, corona devices are also commonly used to perform a variety of other functions in the electrophotographic reproducing process. For example, corona devices aid in the transfer of a toner image from a reusable photoreceptor to a transfer member, the tacking and the detacking of paper to the imaging member, and the conditioning of the imaging surface before and after the deposition of toner to improve the quality of the electrophotographic copies produced.

The operation of corona discharge devices, particularly at higher levels of output of corona charging, results in the formation of ozone in the atmosphere adjacent to the corona generator. As indicated in U.S. Pat. No. 3,983,393, increased copy speeds, as well as other requirements placed on modern copying and duplicating machines, have resulted in needs for higher outputs from the corona devices. This in turn has resulted in a need for an efficient ozone removing means. It is, of course, well known that ozone is extremely reactive and it can attack machine components as well as being toxic to humans. Relatively low concentrations of ozone in the atmosphere, for example from one part per thousand to one part per million, can cause headaches and nausea and irritation of mucus membranes.

Various ozone removing devices and methods have been proposed in the prior art. For example, in said U.S. Pat. No. 3,983,393, there is disclosed a corona device with reduced ozone emission. In the corona device of said patent, various configurations of ozone reducing members are interposed between the corona electrode and the corona shield to partially surround the corona electrode. Those ozone reducing members are coated with a catalytic material to reduce the ozone concentration. One such ozone decomposing material is a mixture of metallic oxides available as "hopcalite" from the Mine Safety Appliances Corporation.

In U.S. Pat. No. 3,675,096, there is disclosed a corona discharge device in which the corona generating electrode is enclosed within a housing having a foraminous screen as a portion thereof. A catalyst is disposed within the housing "to convert—ozone—to oxygen". Suitable catalysts disclosed in said patent include such metals as silver, gold, nickel, platinum, iron and their alloys. Also disclosed are certain metal oxides. Since the metal oxides do not lend themselves to being applied in the form of a catalytic coating, said U.S. Pat. No. 3,675,096 proposed that such oxides may be used by being disposed within the housing in foraminous screen containers.

In U.S. Pat. No. 4,110,425 there is disclosed a hydrogen-storing material which is made by mixing a hydrogen-absorbent material with a plastic material in emulsion or solution form, and then molding the mixture into desired shapes. The method of that patent for making shaped hydrogen-storing material is based on the therestated finding that the hydrogen-absorbent material may be incorporated within the plastic material, with extensive coating of the surfaces of the hydrogen-absorbent material by the plastic material, without loosing hydrogen-storing capacity and without any reduction in the desorption rate.

U.S. Pat. No. 3,051,662 is another prior art patent disclosing a method for making catalyst structures in which the finely divided particles of the catalyst material is mixed with a polymer and the resulting mixture is compressed in a punch press to form the desired shape structures. Again, a substantial proportion of the catalyst particle is completely enclosed by the polymer matrix and thus does not come into direct contact with the outside atmosphere. Similarly, U.S. Pat. No. 3,775,192 discloses an analogous process for making catalyst tablets.

U.S. Pat. No. 3,926,851 discloses a method for preparing oxidation catalysts structures for use in automobile exhaust systems which is a porous ceramic base impregnated with suitable oxidizing agents. The method consists of shaping a ceramic filled polyolefin material containing a plasticizer, extracting the plasticizer, burning off the polyolefin, firing the porous shaped ceramic structure, and impregnating the structure, for example by slurry coating, with an engine exhaust oxidizing agent.

U.S. Pat. Nos. 3,381,454 and 3,925,248 disclose filter media for gases which is made of a plastic foam material and a catalytic material. In U.S. Pat. No. 3,381,454, the filter is made by incorporating the catalytic material in the polyurethane form material as the foam is being formed. In U.S. Pat. No. 3,925,248, the catalytic material is present in the form of small particles which are held in place by entrapment in the open pores and by surface Van de Waals forces in the foam plastic material.

Finally, U.S. Pat. Nos. 1,345,323 and 1,422,211 disclose hopcalite as a suitable catalyst for the treatment of gases.

Although hopcalite is a known catalyst for the decomposition of ozone, the foregoing prior art shows that it is difficult to use and there is a continuing need for improved methods and materials to take advantage of the catalytic activity of hopcalite. For example, if hopcalite is placed in the foraminous container of the device in U.S. Pat. No. 3,675,096, many problems would be created by such a usage. In the first place, hopcalite is a relatively expensive material, and the use of solid particles of hopcalite per se in a container will bring the result that only the surface of the hopcalite particles are utilized in the desired catalytic activity. Thus, with the use of relatively large hopcalite particles, most of the hopcalite is not effectively utilized. When fine particles of hopcalite particles are used in a bed, the pressure drop across an effective bed is relatively large, which may interfere with other machine functions in a copier/duplicator where sheets of paper are routinely and rapidly transported. Moreover, fine particles of hopcalite would be likely to escape the foraminous containers of U.S. Pat. No. 3,675,096 and cause contamination of macine components. If hopcalite particles are mixed with a plastic binder emulsion solution, see U.S. Pat. No. 4,110,425, the effectiveness of the hopcalite would be greatly diminished or completely negated. Accordingly, there is a need for improved method and materials for employing the catalytic activity of hopcalite to decompose ozone.

SUMMARY OF THE INVENTION

It is an object of the present invention to provide a novel composite material for the removal of ozone from a gaseous stream. It is another object of the invention to provide a novel composite material for the removal of ozone which is relatively inexpensive to make, stable in storage and handling, effective in reducing ozone concentrations to relatively harmless levels, and which can be used without interfering with other machine functions in a copier/duplicator environment. These and other objects of the invention will be apparent from the following disclosure.

In accordance with the present invention, a composite material for the removal of ozone from a gaseous stream is provided which, in one embodiment, comprises a support matrix having coated on its surface an adhering layer of finely divided particles of hopcalite. When the surface of the supporting matrix can be made adhesive to the hopcalite as, for example, by the action of heat or a softening agent, the particles of hopcalite may be coated directly onto the support matrix. When the surface of the support matrix cannot be easily made to be adhesive to the hopcalite, then the surface of the support matrix may be first coated with a relatively thin layer of an adhesive medium, with the particles of hopcalite coated on the layer of adhesive medium.

DETAILED DESCRIPTION OF THE INVENTION

Figure 1:
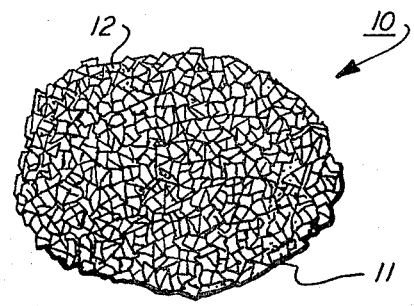
FIG. 1 is a schematic view of a particle of composite material of the present invention.

Referring to FIG. 1, a particle of the composite material of the prevent invention is shown to be composed of a core 11, and an adhering layer of relatively fine hopcalite particles 12 adhering to the surface of core 11. It is preferred that the core 11 be of generally spheroidal shape. Irregularly shaped cores, or other non-spheroidal shapes, tend to result in a composite material which when used in a filter, results in a higher pressure drop across the filter containing comparable amounts of a rounded cored material. Other disadvantages of irregularly shaped cored materials include the fact that a gaseous stream passing through a bed of such cored material tends to be less evenly distributed. Although the core 11 may be constructed of practically any material, it must be made of a material which has dimensional stability at temperatures commonly found in the atmosphere around a copier or duplicator. We prefer to use as the materials for making the core 11 those that have a relatively broad transition region, that is, materials which will soften and become tacky over a wide temperature range, but which would retain a sufficiently high surface tension so as not to liquify and flow within that temperature range. With such materials, the core 11 can be caused to be softened and tacky within such a temperature range and thus provide an adhesive surface for the coating of a layer of finely divided particles of hopcalite. In this respect, we particularly prefer to use as the material for making the core 11 a polymeric ethyl vinylacetate (EVA), which is a copolymer of ethylene and vinyl acetate. At the present time, EVA is commercially available at several different proportions of ethylene monomers to the vinyl acetate monomers in the polymer mix. For example, EVA is available which is made from a monomer mix containing 18% by weight of vinylacetate, based on the weight of the ethylene monomer present. Another commercially available EVA contains 28 weight percent vinylacetate monomers, based on the weight of the ethylene monomer. These different types of EVA polymers have different melting or softening temperature ranges. For example, the EVA containing about 28% vinylacetate monomer, based on the weight of the ethylene monomer, has a softening or melting temperature of about 108° C. Other EVA materials have considerably different softening or melting temperatures, for example, in the 64°–65° C. range. We prefer to use the EVA material which has a softening point at about 108° C. since this insures that the resultant composite material would have dimensional stability at temperatures that are likely to be encountered under ordinary conditions.

Other materials which can be used to make the core 11 include glass beads, high density polyethylene, amorphous polypropylene, polystyrene, certain acrylics and some polyamides. However, almost all such other materials do not have a wide melting or softening temperature range within which to provide a tacky surface for the coating of a layer of hopcalite particles. Thus, for example, when high density polyethylene beads are to be used in place of EVA beads for the core 11, the surface of the polyethylene beads must be made adhesive to the hopcalite particles, for example, by coating the polyethylene beads with a thin layer of an adhesive material or by the action of a solvent on the surface of the polyethylene beads. In this respect, EVA beads are the preferred material for making the core 11.

The size of the composite material particle is not critical and it can be varied over a wide range. However, the particle 10 should not be too large since large particles are inefficient for use in a filter to bring about intimate contact between a gaseous stream and the hopcalite coated on the surface of particles of composite material 10. At sizes of composite material particles 10 which are very small, for example, 0.1 mm., the coated hopcalite particles would have to be much smaller still and would approach the size of fine dust particles. Such small particles of hopcalite and the core material are difficult to handle and process. In addition, they offer more hazards physiologically. At the present time, EVA particles are commercially available at an average diameter of about 3–3.5 mm. Although such sized particles can be used as the core in making the composite material of the present invention, the resultant particle size would be such that when the particles are packed in a filter in the configuration shown in FIG. 2, the probability of the gaseous stream channeling would be greatly increased. We prefer to comminute the commercially available EVA beads to an average particle diameter of about 1 to 2 mm.

Hopcalite is presently commercially available in a 10 mesh size, which corresponds to an average particle diameter of approximately 2,000 microns or 2 mm.

Clearly, such hopcalite particles are too large for the efficient utilization of expensive hopcalite material. However, hopcalite is also a fragile material in that it can be broken into extremely fine dust like particles by rubbing between fingers. Thus, size reduction of the hopcalite particles must be carefully carried out. We prefer to use a high speed peg mill to reduce the size of hopcalite particles to about 150–425 microns, corresponding to 40–100 mesh range.

The relative amount of hopcalite to core material can be varied, depending on the sizes of the particles used for the core 11 and for the coated hopcalite layer 12. It is preferred that a sufficient amount of hopcalite particles is used to cover the entire surface area of the core 11, but that no hopcalite particles be embedded inside of core 11 since such interiorally embedded hopcalite particles would not come into contact with ozone in the gaseous stream and thus represents a waste of the expensive hopcalite material. In general, we have found that between about 2 to 58% of hopcalite by weight based on the weight of the EVA core material, to be suitable. In particular, when EVA beads of between 1 to 2 mm. average diameter is employed with hopcalite particles having an average particle diameter between about 150 to 425 microns, we have found that between about 30–35% by weight of hopcalite, based on the weight of the EVA particles, to be particularly preferred.

The encapsulation of the core 11 by the hopcalite particles 12 can be carried out by various means. For example, the core material and the hopcalite particles can be charged into a fluidized bed apparatus which is equipped to heat the mixture to the tack temperature of the surface of the core, which represents the transition temperature region of the surface of the core. As the core is coated with hopcalite particles, the composite material will drop downward through the fluidized bed and is collected in the region above the distribution or diffusion plate. Another method for making the composite material of the present invention is to charge the mixture of hopcalite particles and the core materials into a rotary furnace which is maintained at the tack temperature of the surface of the core material. Such a furnace should be able to maintain a temperature within the range of about 20°–280° C. Through the rotation of such a furnace, the core material will come into intimate contact with the hopcalite particles and be eventually completely coated thereby.

When glass beads or other materials are used as the core whose surface cannot be easily made tacky, it is convenient to use a coating of another material on such a core which can be easily made tacky. For such purposes, we prefer to use a coating of the EVA material. For example, when high density polyethylene or glass beads are to be used as core material, a solution of EVA can be coated thereon. The EVA can be solubilized in known solvents such as toluene, cyclohexanol, methylethylketone, etc. The coating should result in a layer of EVA on the core of a thickness approximately 5% of the average diameter of the hopcalite particles. More or less coating materials may be used, but we have found that such an amount is sufficient for attaching the hopcalite particles to the core.

Figure 2:
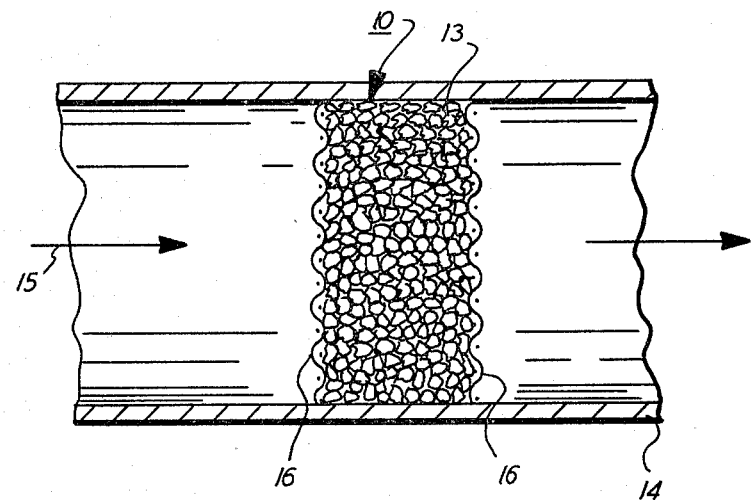
FIG. 2 is a cross-sectional view of a filter for a gaseous stream using the composite material of FIG. 1.

Referring to FIG. 2, there is shown a filter device 13 located in a conduit 14 for the passage therethrough a gaseous stream 15. The filter 13 is packed with a bed of particles of the composite material 10, which is held in place at each end of the filter device 13 by a foraminous member 16. Foraminous member 16 has openings therein of a size sufficient to permit the passage of a gaseous stream 15 therethrough without appreciable pressure drop thereacross and yet able to retain particles of composite material 10 within the filter 13. The width or thickness of the filter device 13, or more accurately the thickness of the bed of the composite materials 10, depends on a number of factors, including, the concentration of ozone in the entering gaseous stream, the concentration of ozone to be achieved in the gaseous stream leaving the filter device, the gas flow rate or throughput rate, the cross-sectional area of the filter device 13, the pressure drop across the filter device 13, etc. Generally, practical filter devices are designed to have a residence time for the gaseous stream therein substantially less than one second.

To be practical, a filter device for the removal of ozone must have an efficiency greater than 90%, and preferably having efficiency greater than 95%. In this respect, efficiency is defined as the percentage of ozone that is present in the incoming gaseous stream which is removed or decomposed by the filter device. The present OSHA standard for ozone is 0.1 parts per million for a period of 8 hours. Suprisingly, filter devices made with the composite material of the present invention have ozone removal efficiencies of over 99% in prolonged periods of operation. More specifically, filter devices having a bed of composite material of the present invention less than one inch thick are able to meet or exceed the OSHA mandated standard on ozone, starting with ozone containing gases commonly found in the environment of modern, high speed copier/duplicators.

The invention will be further illustrated with the following specific examples.

EXAMPLE I

Hopcalite was obtained from the Mine Safety Appliance Corporation, which has a particle size of about 10 mesh corresponding to an average particle diameter of about 2 mm. Hopcalite is a porous ceramic material made of about 80% mangenese oxide ($MnO_2$), about 20% cupric oxide (CuO), and the residual amounts of lithium oxide ($Li_2O$) and potassium oxide ($K_2O$). The hopcalite was reduced in size in a high speed peg mill operated about 20,000 rpm. About 70% of the hopcalite fed to the mill was converted to particles having a size in the range of 150–425 microns.

A polymeric ethylvinylacetate (EVA) was obtained from the Union Carbide Corporation under its designation number 301. This material is believed to be made from a mixture of monomers containing 28 parts by weight vinylacetate monomers and 100 parts by weight ethylene monomer. It had a softening or tacky temperature of about 108° C. This material had an average particle size of about 3 to 5 mm. It was comminuted to particles having an average size of between 1 to 2 mm.

The hopcalite particles from the peg mill, having a size in the range of about 150–245 microns, were charged into a fluidized bed which is made essentially of a glass column. Heated air was used as the fluidizing medium and the hopcalite particles were heated to about 200° C. The comminuted EVA particles were dropped through the bed to heat and coat the EVA particles with the hopcalite particles, which were at the higher temperature of about 200° C. Fully coated EVA beads were collected at the bottom of the fluidized bed.

EXAMPLE II

The procedure of Example I was repeated except that the comminuted hopcalite particles and the EVA particles were passed through a rotary furnace. The furnace employed was a 2.5 inch I.D., 36 inch long single zone furnace. Two aluminum spacers, 0.5 inch in height and 36 inches in length, spaced 180° apart, were positioned inside the furnace to insure mixing of the materials therein. The hopcalite and EVA particles were premixed in a blender before charging to the rotary furnace. The temperature in the rotary furnace was maintained within the transition temperature region of the core material, in this case about 100° C. for the EVA particles. The residence time in the rotary furnace necessary to give a completely coated product depends to some extent on the relative amounts of hopcalite to the EVA particles in the charge. We employed a mixture rich in hopcalite particles, about 2 parts by weight hopcalite to 1 part by weight EVA, and a residence time of 3 to 4 minutes was found to be satisfactory. The resultant coated beads contained about 34% by weight hopcalite, based on the weight of the EVA particles.

EXAMPLE III

High density polyethylene beads were obtained from City Service under its designation number MPE775. These particles had an average size of about 0.1 inch or about 2.5 mm. About a pound of the polyethylene particles was placed in a vibrating mixing apparatus called Vibra-tub. Warm toluene was added to the polyethylene to swell the surface of the particles. An infrared heat lamp was then used to evaporate the toluene.

Separately, polymeric ethylvinylacetate (EVA), obtained from Union Carbide as EVA-301, is dissolved in toluene in the ratio of 1 gram of EVA to 2 grams of toluene, to make a viscous solution. This viscous solution of EVA was added to the surface-swelled polyethylene particles in the Vibra-tub in an amount corresponding to about 5% by weight EVA based on the weight of the polyethylene particles. As the mixing and tumbling of the mixture continued, the heating from the heating lamp causes the mixture to loose toluene and to dry. As the mixture is drying, the particles become tacky and agglomerate together. At this time, the Vibra-tub motion is stopped and a small amount of additional mixing action is provided manually with a spatula. When the particles are completely dried, the mixing action from the spatula will cause the particles to completely separate to produce substantially evenly coated polyethylene beads having a layer of EVA on its surface.

Hopcalite particles having a size in the range of about 150 to 212 microns were separately prepared in accordance with the procedure indicated in Example I. A tumbling jar with internal flutes was then filled with approximately 50% by volume with EVA coated polyethylene beads and equal amount by weight of the hopcalite particles. The jar is then rotated slowly with heating provided by infrared lamps maintaining an average temperature in the jar of about 85° C. Within a few minutes after equilibrium temperature was reached, the EVA coated polyethylene beads were completely encapsulated by the hopcalite particles.

EXAMPLE IV

The hopcalite coated beads made in accordance with Example II were tested for their ozone removing efficiency. The apparatus employed was essentially similar to that shown in FIG. 2. The hopcalite coated particles were made into a bed of two inches in diameter and 0.5 inch in thickness. Air at 70° C., with a relative humidity of about 42%, containing 46.0 parts per million zone was passed through this bed at a rate of about 1.4 cubic feet per minute. The hopcalite was coated on EVA beads having an average diameter of about 1.5 mm, and it contained about 38 parts by weight hopcalite to 100 parts by weight EVA. This experiment represented an average residence time of the gaseous stream in the hopcalite bed of about 0.04 second.

The ozone removal efficiency, defined as the amount the ozone present in the initial gaseous stream minus the amount of ozone in the treated gaseous stream divided by the amount of ozone initially present, was measured over a period of more than 8 hours of continuous operation. It was found that ozone removal efficiency of the hopcalite coated EVA filter was substantially above 99% during the entire test period.

EXAMPLE V

The procedure of Example IV was repeated in a test for the life of the ozone filter. The hopcalite coated particles were made into a bed two inches in diameter and $\frac{3}{8}$ inch thick. The inlet air contained an average of about 11.6 parts per million ozone, and it was passed through the filter at a linear velocity of about 8.64 ft/min.. During a continuous run of more than 158 hours, the exit gas contained less than 0.01 ppm ozone, which was less than the ambient value. The ozone removal efficiency was greater than 99.9%. Based on the data collected, it was estimated that the life of such an ozone filter would be equal to or exceed that of an average electrostatographic copying machine.

While the invention has been described in detail with reference to specific preferred embodiments, it will be appreciated that various modifications may be made from the specific details without departing from the spirit and scope of the invention.

What is claimed is:

1. A composite material for the removal of ozone from a gaseous stream comprising a support matrix having coated on its surface an adhering layer of finely divided particles of hopcalite, said support matrix having a relatively broad transition region for coating said adhering layer of finely divided particles of hopcalite hereon, and said support matrix having dimensional stability at the temperature of said ozone containing gaseous stream.

2. A composite material according to claim 1 wherein said support matrix is substantially spheroidal in shape.

3. A composite material according to claim 2 wherein said support matrix is ethylene vinyl acetate beads.

4. A composite material according to claim 2 wherein said support matrix is glass beads having coated on the surface thereof a layer of ethylene vinylacetate.

5. A composite material according to claim 2 wherein said support matrix is polyethylene beads having coated on the surface thereof a layer of ethylene vinyl acetate.

6. A composite material according to claim 3 wherein said ethylene vinyl acetate beads are about 0.5 mm to 2.0 mm in size.

7. A composite material according to claim 3 wherein said hopcalite particles are about 150 to 425 microns in size.

8. A composite material according to claim 3 wherein said hopcalite is present in an amount about 2–58 weight percent of the support matrix.

9. A composite material according to claim 6 wherein said hopcalite particles are about 150 to 425 microns in size, and wherein said hopcalite is present in an amount about 20–58 weight percent of the support matrix.

10. A method for making the ozone removing composite material of claim 1 comprising providing a support matrix, preparing the surface of said support matrix so that said hopcalite particles will adhere thereto, and mixing finely divided hopcalite particles with the prepared support matrix.

11. A method according to claim 10 wherein said support matrix is ethylene vinyl acetate beads, and wherein the surface of said beads is made adhesive to said hopcalite particles by heating.

12. A method according to claim 11 wherein said ethylene vinyl acetate beads are about 0.5 to 2.0 mm in size, and wherein said hopcalite particles are about 150 to 425 microns in size.

13. A method according to claim 11 wherein the beads are heated to a temperature about 20°–280° C.

14. A method according to claim 12 wherein said hopcalite particles are present in an amount about 34 weight percent of the support matrix.

15. A method according to claim 10 wherein said support matrix is prepared by providing polyethylene beads, softening the surface of said beads with a solubilizing agent, heating said beads to at least partially evaporate said solubilizing agent, separately providing a solution of ethylene vinyl acetate in a solvent, mixing and heating said heated beads with said solution to coat said beads with a layer of said solution while evaporating said solvent.

* * * * *